US012801414B1

(12) United States Patent
Bhatia et al.

(10) Patent No.: US 12,801,414 B1
(45) Date of Patent: Nov. 17, 2026

(54) SERVERLESS FUNCTION GROUP WITH SHARED DATA STORE

(71) Applicant: Amazon Technologies, Inc., Seattle, WA (US)

(72) Inventors: Sushant Bhatia, Kirkland, WA (US); Prashant Kumar Singh, Seattle, WA (US); Christopher Magee Greenwood, Seattle, WA (US); Tarun Rai Madan, Seattle, WA (US); Philip Daniel Piwonka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 821 days.

(21) Appl. No.: 18/066,950

(22) Filed: Dec. 15, 2022

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS 8,589,554 B2 11/2013 Kelkar et al.
9,426,019 B1 8/2016 Nagargadde et al.
10,102,480 B2 10/2018 Dirac et al.
10,552,774 B2 2/2020 Shih et al.
10,884,787 B1 1/2021 Wagner et al.
10,942,795 B1 3/2021 Yanacek et al.
11,010,188 B1 5/2021 Brooker et al.
2015/0220364 A1 8/2015 Jackson
2018/0060132 A1 3/2018 Maru
2020/0412720 A1 12/2020 Siefke et al.
2020/0412825 A1 12/2020 Siefker et al.
2021/0042085 A1 2/2021 Guttmann
2021/0073059 A1* 3/2021 Swildens ............. G06Q 10/107

(Continued)

OTHER PUBLICATIONS

Serverless, Serverless.yml Reference, Nov. 30, 2021, https://web.archive.org/web/20211130112027/https://www.serverless.com/framework/docs/providers/aws/guide/serverless.yml (Year: 2021).*

(Continued)

*Primary Examiner* — Wei Y Mui
(74) *Attorney, Agent, or Firm* — Robert C. Kowert; Kowert, Hood, Munyon, Rankin & Goetzel, P.C.

(57) ABSTRACT

Embodiments of a serverless function execution (SFE) system are described that enable the provisioning, execution, and management of serverless function groups (SFGs). In embodiments, the SFG is a group of serverless functions implemented on a set of on-demand computing resources provided by the SFE system. The computing resources may include a shared file store and a shared execution cache accessible by the serverless functions in the group. The execution cache may be implemented in volatile memory as a key-value store. The file store may be implemented as a shared volume attached to the computing resources. In embodiments, the SFE system provides an invocation interface that allows the serverless function instances in the SFG to invoke one another. Advantageously, the SFG enables developers to build sophisticated serverless applications using multiple serverless functions that the serverless functions to share execution state and file data.

20 Claims, 9 Drawing Sheets

(56) References Cited

U.S. PATENT DOCUMENTS

| | | | | |
|---|---|---|---|---|
| 2021/0157645 | A1 | 5/2021 | Yanacek et al. | |
| 2021/0191782 | A1 | 6/2021 | Ahmed et al. | |
| 2021/0263779 | A1* | 8/2021 | Haghighat | G06F 9/5061 |
| 2023/0308442 | A1* | 9/2023 | Lejin P J | H04L 9/3239 |

OTHER PUBLICATIONS

BlueXP, Understanding AWS EFS Shared Storage for Files, Block Storage, Object Storage and VDI, Sep. 24, 2020, https://bluexp.netapp.com/blog/aws-cvo-blg-aws-shared-storage-for-files-block-object-storage#H_H1 (Year: 2020).*

Yuhui Deng, Deconstructing Network Attached Storage systems, Journal of Network and Computer Applications, vol. 32, Issue 5, 2009, pp. 1064-1072, ISSN 1084-8045, https://doi.org/10.1016/j.jnca.2009.02.006. (Year: 2009).*

Yuan Tang and Jian-Ping Li, "Towards overlay network in virtual computing environment," 2009 International Conference on Apperceiving Computing and Intelligence Analysis, Chengdu, 2009, pp. 274-277, doi: 10.1109/ICACIA.2009.5361102. (Year: 2009).*

GitHub (Horike37), Which is best folder/file structure to organize multiple functions of service in v1.0 #2372, Oct. 16, 2016, https://github.com/serverless/serverless/issues/2372 (Year: 2016).*

Serverless Forum (DavidWells), Use file for custom settings and add settings to yml, Feb. 2017, https://forum.serverless.com/t/use-file-for-custom-settings-and-add-settings-to-yml/1210 (Year: 2017).*

StackOverFlow (Gaurav Mantri), Azure Function Blob Trigger copy file to File Share, Sep. 17, 2021, https://stackoverflow.com/questions/69216133/azure-function-blob-trigger-copy-file-to-file-share (Year: 2021).*

Gourav Jain, Durable Functions—Patterns—Fan Out And Fan In, Jul. 16, 2021, https://www.c-sharpcorner.com/article/durable-functions-patterns-fan-out-and-fan-in/ (Year: 2021).*

InsterCloud, Writing to Blob Storage From An Azure Function, May 27, 2021, https://instercloud.com/blog/Writing%20to%20Blob%20Storage%20From%20An%20Azure%20Function (Year: 2021).*

U.S. Appl. No. 17/482,272, filed Sep. 22, 2021, Ramyanshu Datta et al.

U.S. Appl. No. 17/482,276, filed Sep. 22, 2021, Ramyanshu Datta, et al.

U.S. Appl. No. 18/642,668, filed Apr. 22, 2024, Ramyanshu Datta, et al.

* cited by examiner

SERVERLESS FUNCTION GROUP WITH SHARED DATA STORE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

One example use of data centers is to implement on-demand execution services to execute short-lived and stateless units of code on ephemeral virtual resources provided by the service. These execution services do not generally provide data durability or data sharing capabilities across code executions, and do not allow code executing on different virtual resources to communicate with one another. These issues limit the type of workloads that can be built on these execution services, such as workloads with complex execution patterns or workloads that must run at scale.

Figure 1:
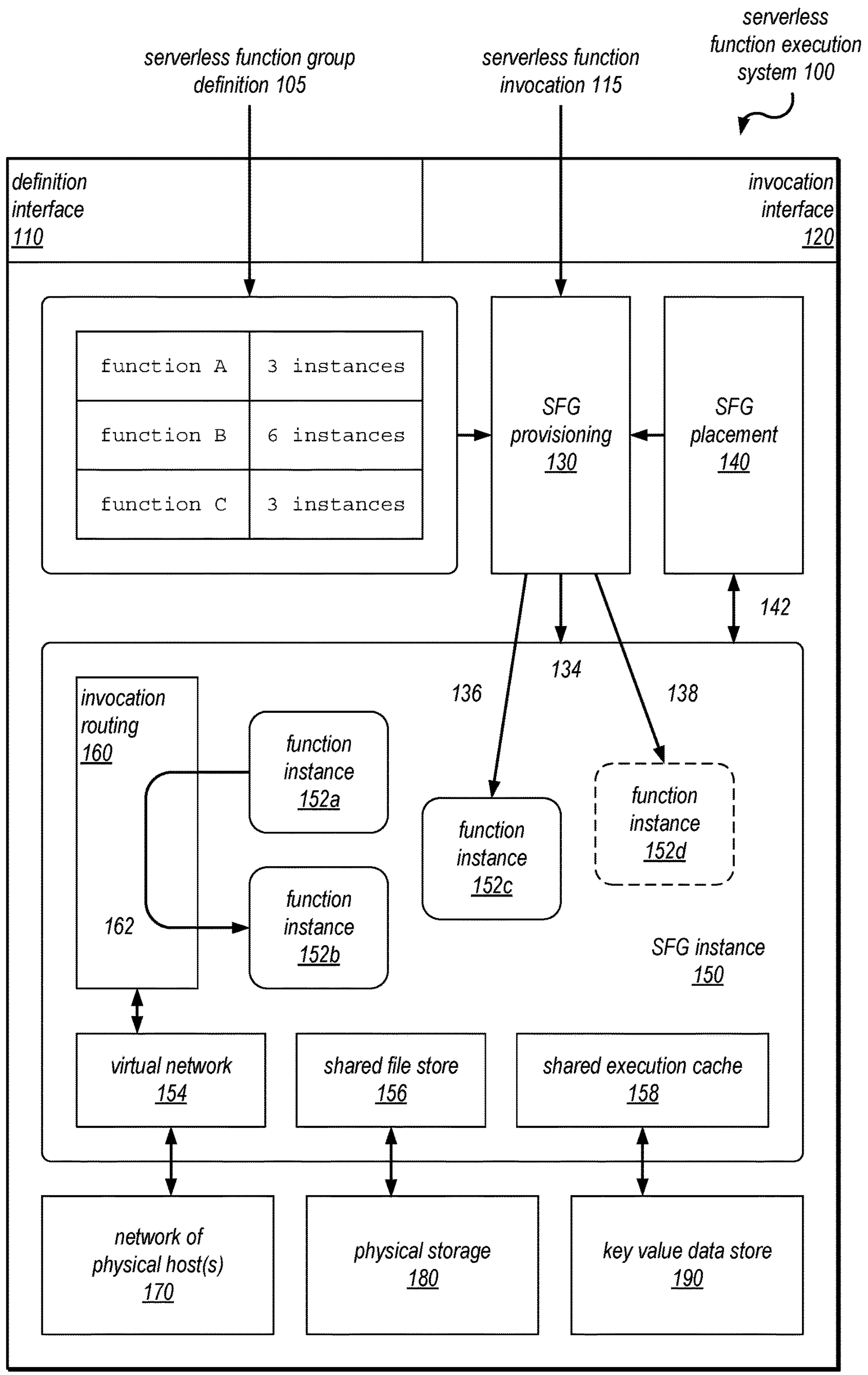
FIG. 1 illustrates an embodiment of a serverless function execution (SFE) system capable of executing serverless function groups, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Generally described, the present disclosure relates to embodiments of a serverless function execution (SFE) system that allows customers to define and execute a serverless workload using a group of serverless functions.

As described herein, a serverless compute system (which may also be referred to as a "serverless code execution system" or an "on-demand code execution system") enables rapid execution of code, which may be supplied by users of the serverless compute system. On submitting code, the serverless compute system can then enable the user to submit "calls" or "invokes" to execute the code, at which point the serverless compute system will generate an execution environment for the code and execute the code within the environment to provide the desired functionality. The environment can then be destroyed shortly after providing the desired functionality, such that a user is responsible only for resources used during execution. These execution times are often very short, making serverless computing highly efficient, particularly for tasks with varying demand levels. However, because the serverless compute system (and not the end user) generally handles management of execution environments, including selection of a host device on which to place the environment, an end user is generally not enabled to guarantee that a particular invocation will result in execution in a particular environment. For this reason, serverless executions are often designed or even restricted to being stateless, such that the result of one execution of code does not depend on processing done during a prior execution of the code.

The serverless compute system, as described in detail herein, may provide a network-accessible service enabling users to submit or designate computer-executable code to be executed by virtual machine instances (or other execution environments, such as containers providing operating-system level virtualization) on the serverless compute system. Each set of code on the serverless compute system may define a "task" or "function" and implement specific functionality corresponding to that function when executed on a virtual machine instance of the serverless compute system. Individual implementations of the function on the serverless compute system may be referred to as an "execution" of the function (or a "function execution"). The serverless compute system can further enable users to trigger execution of a function based on a variety of potential events, such as detecting new data at a network-based storage system, transmission of an application programming interface ("API") call to the serverless compute system, or transmission of a specially formatted hypertext transport protocol ("HTTP") packet to the serverless compute system. Thus, users may utilize the serverless compute system to execute any specified executable code "on-demand," without requiring configuration or maintenance of the underlying hardware or infrastructure on which the code is executed. Further, the serverless compute system may be configured to execute functions in a rapid manner (e.g., in under 100 milliseconds [ms]), thus enabling execution of functions in "real-time" (e.g., with little or no perceptible delay to an end user).

Typically, the serverless compute systems are designed to execute units of short-lived and stateless code (e.g. a serverless function to process a particular event). The serverless compute system does not generally maintain execution state across function instances and does not allow executing function instances to communicate with one another. Due to the limitations of current serverless compute systems, it can be challenging to build certain types of serverless applications on these systems. For example, it is difficult to build a video encoding application that passes video data from one function instance to another, where each function manipulates the video data in a different step of the process. Because each function instance must access the video file individually, their accesses can be blocked due to concurrent access restrictions at the data store (e.g. a connection limit, data throughput limit, or I/O operation rate limit). Even if the data accesses are not blocked, it is time-consuming and wasteful to repeatedly access the video data for each step in the process. As another example, current serverless compute systems cannot easily support a MAPREDUCE-like execution model, where the work is split among a large number of concurrent data access or "map" functions, who then pass their results back to an aggregator or "reducer" function. Current serverless compute systems do not provide a good mechanism that allows one function instance to invoke and pass execution results to another function instance. This problem is exacerbated in cases where new child function instances are dynamically spawned during the process. As a last example, a typical distributed computing application (e.g. a large-scale simulation or modeling application) that requires communication among a large number of worker nodes in a cluster (e.g. a SPARK cluster) can be extremely difficult to implement on current serverless compute systems. Developer efforts to work around these problems often fall back on long-lived resources outside the serverless compute system, which effectively renders the application "serverful" and reduces the benefits of the serverless computing model.

To address these and other problems of the state of the art, the present disclosure describes embodiments of a serverless function execution (SFE) system that allows customers to define a serverless workload using a group of serverless functions (a serverless function group or SFG). The SFE system is implemented using specially programmed computer system(s) to, among other things, execute the workload using the SFG, manage resource provisioning to support execution of function instances in the SFG, maintain shared execution state and file data for the function instances during execution of the workload, and enable programmatic interactions among the function instances during execution.

In some embodiments, the SFG is provisioned using a group of virtual computing resources hosted on a common set of physical hosts (in some cases a single physical host). Live function instances in the SFG may be implemented as individual virtual machine instances, which may be connected via a virtual network overlayed on the underlying physical host(s). The computing resources of the SFG may also include a shared file store and a shared execution cache accessible by the serverless functions in the group. The shared execution cache may be implemented as a key-value store in volatile memory. The shared file store may be implemented as a shared volume that is local to the virtual machine instances. The SFE system may provide an invocation interface to allow the serverless function instances in the SFG to invoke and pass invocation data among one another, or in some embodiments, serverless functions in other SFG instances.

Advantageously, the disclosed SFE system improves the functioning of the serverless compute systems of the state of the art to enable the building of sophisticated serverless workloads based on a group of related serverless functions. The SFE system implements a practical application that provides a number of technical advantages, including:

- co-location of related serverless functions of a workload on a common set of physical resources (e.g. a single physical host),
- improvement of data locality during serverless workload execution,
- allowing the serverless workload to scale to a large number of concurrent serverless function instances,
- improved coordination of execution among different types of serverless functions,
- sharing of runtime execution data among function instances,
- enabling of function-to-function invocation within in the group,
- enabling communication among different serverless function groups, and
- isolating the serverless function group to a single secure network.

As will be appreciated by those skilled in the art, the features of the disclosed SFE system are designed to solve technical problems rooted in the computer field, and are not intended to capture any human mental and pen-and-paper processes, basic methods of organizing human activity, pure mathematical processes and formulas, and/or conventional business practices. These features and advantages of the SFE system are described in further detail below, in connection with the figures.

FIG. 1 illustrates an embodiment of a serverless function execution (SFE) system capable of executing serverless function groups, according to some embodiments.

As shown, the figure depicts a serverless function execution system 100. The SFE system 100 is capable of storing customer-supplied code (e.g. custom serverless functions) and executing the functions using virtualized compute resources (e.g. virtual machines or containers) provided on an as-needed basis. As shown, the SFE system 100 provides a definition interface 110 to receive a serverless function group definition 105. The SFG definition 105 defines a group of serverless functions that belong to the SFG (here functions A, B, and C), and the number of instances of each serverless function to provision for the group. Depending on the embodiment, the SFG definition may indicate a minimum number of instances of a function type (e.g. instances that will be maintained during the lifetime of the SFG), a maximum number of instances of a function type (e.g. the maximum number of concurrent instances that the SFE system will provision to scale the SFG), or both a minimum and a maximum.

As shown, the SFE system 100 also provides an invocation interface 120 to receive serverless function invocations 115, such as an event triggering a serverless execution by the SFG or an invocation request. In response, the SFE system 100 uses a SFG provisioning component 130 to provision 134 an instance of the SFG 150 according to the SFG definition 105. The SFG provisioning component 130 may also be responsible for releasing or deprovisioning the SFG instance 150 when the SFG finishes the serverless execution (e.g. when all function instances in the SFG instance have completed execution). In some embodiments, the SFG provisioning component 130 will manage the life cycle of the provisioned SFG instance 150 as well as individual function instances 152*a-d* within the SFG instance during the serverless execution. For example, the SFG provisioning component may provision 136 a new function instance when it is needed during a serverless execution, and deprovision 138 an existing function instance when it is no longer needed. Provisioning a serverless function instance 152 may involve launching a virtual machine instance (or selecting a running VM instance from a pool) that is deployed with the code of the function. Provisioning the SFG instance 150 may entail provisioning the minimum number serverless function instances required by the SFG, as specified by the SFG definition 105.

As shown, the SFE system 100 implements a SFG placement component 140, which may be implemented as part of the SFG provisioning component 130 or a separate component (e.g. an independent service), depending on the embodiment. The SFG placement component 140 is tasked with selecting physical hardware resources (e.g. physical hosts) to host the SFG instance 150 and its serverless function instances 152*a-d*. For example, the physical server (s) used to initially provision the SFG instance 150 may be selected by the SFG placement component 140. The selection decision may be made based on a variety of factors such as internal policies associated with the SFE system, customer preferences (e.g. as indicated in the SFG definition 105), the current load of hosts in the SFE system, the geographic location that originated the invocation 115, etc.

In some embodiments, as a default rule, the SFG placement component 140 will make a best effort attempt to provision an entire SFG instance, including all function instances and auxiliary resources, on a single physical host. This arrangement can simplify security control of the SFG, and improve data sharing among function instances of the SFG. In some embodiments, the SFG placement 140 may cause the SFG instance 150 or particular function instances 152 in the SFG to be migrated 142 to a different physical host. The migration may be performed based on performance data of the SFG instance monitored by the SFG placement component 140 (e.g. CPU or memory usage metrics of the physical host, data usage metrics, number of SFG instances on host). In some embodiments, a migration may occur as part of a standard housekeeping procedure of the SFE system 100, for example, to periodically rotate idle SFG instances among the physical hosts.

As shown, the SFG instance 150 is provisioned with a number of resources. In some embodiments, the function instances themselves 152 are provisioned as separate virtual machine instances hosted on physical VM host(s). The provisioning component 130 will connect the VM instances in a virtual network 154 in which each VM instance has a specific IP address. In this manner, the VM instances are able to communicate with one another over the virtual network 154, to enable function-to-function communications. The virtual network may be implemented as an overlay network on top of a substrate network connecting the underlying physical hosts 170, or within a single physical host, using software defined network (SDN) software or hardware.

In some embodiments, the virtual network 154 is used by an invocation routing component 160 to enable function-to-function invocations or calls 162 among function instances 152 in the SFG instance. Depending on the embodiment, the invocation routing component 160 may be implemented using resource(s) inside a SFG instance 150 (and e.g. a request queue provisioned and deprovisioned with the SFG instance), or longer-lasting resources outside the SFG instance. In some embodiments, each function instance 152 or VM instance may be deployed with a library that provides a programmatic interface (e.g. an API) that allows the function instance to invoke 162 other function instances 152. An invocation request may be directed to a type of function defined for the SFG (in which case the called function may be provisioned on demand), or a particular function instance already running in the SFG. In some embodiments, the invocation API does not require the caller to know the IP address associated with the callee. Rather, the invocation routing component 160 will handle the internal translation of the invocation to the appropriate IP address and dispatch the call to the called function instance.

In some embodiments, the SFG instance 150 will also include a shared file store 156, which can be used to store data files used by the function instances 152. This data store may be used as temporary file storage during the lifetime of the SFG instance, and spares the function instances 152 from having to individually download shared file data from external data sources. The shared file store 156 is part of the SFG instance 150 and is provisioned and deprovisioned with the SFG instance. In some embodiments, the shared file store 156 may be implemented using physical storage 180, such as a physical storage device that is local to the underlying physical host(s), or physical storage space provided by a network-based volume hosting service. The shared file store 156 may be provided as an attached volume of the VM instances executing the function instances 152. The volume may be provided with different access semantics such as a basic block-based access, a file system, or an object store API. In some embodiments, multiple file stores 156 may be provided to a single SFG instance 150, depending on the SFG definition 105.

In some embodiments, the SFG instance 150 may also include a shared execution cache 158, which can be used to store runtime execution data generated during the serverless execution. In some embodiments, the shared execution cache 158 may also be used to store other data such as environmental variables needed during the serverless execution. The shared execution cache 158 may be implemented as using a key-value data store 190, and may be implemented as an in-memory data store. In some embodiments, the key-value data store may be accessible as volatile memory in the VM instance via a direct memory access (DMA) interface. In other embodiments, the key-value store 190 may be implemented by an in-memory cache cluster such as REDIS. With the combination of the invocation routing component 160 and the shared execution cache 158, the SFE system allows the developers to implement a variety of custom communication protocols to support a variety of sophisticated serverless workloads.

Figure 2:
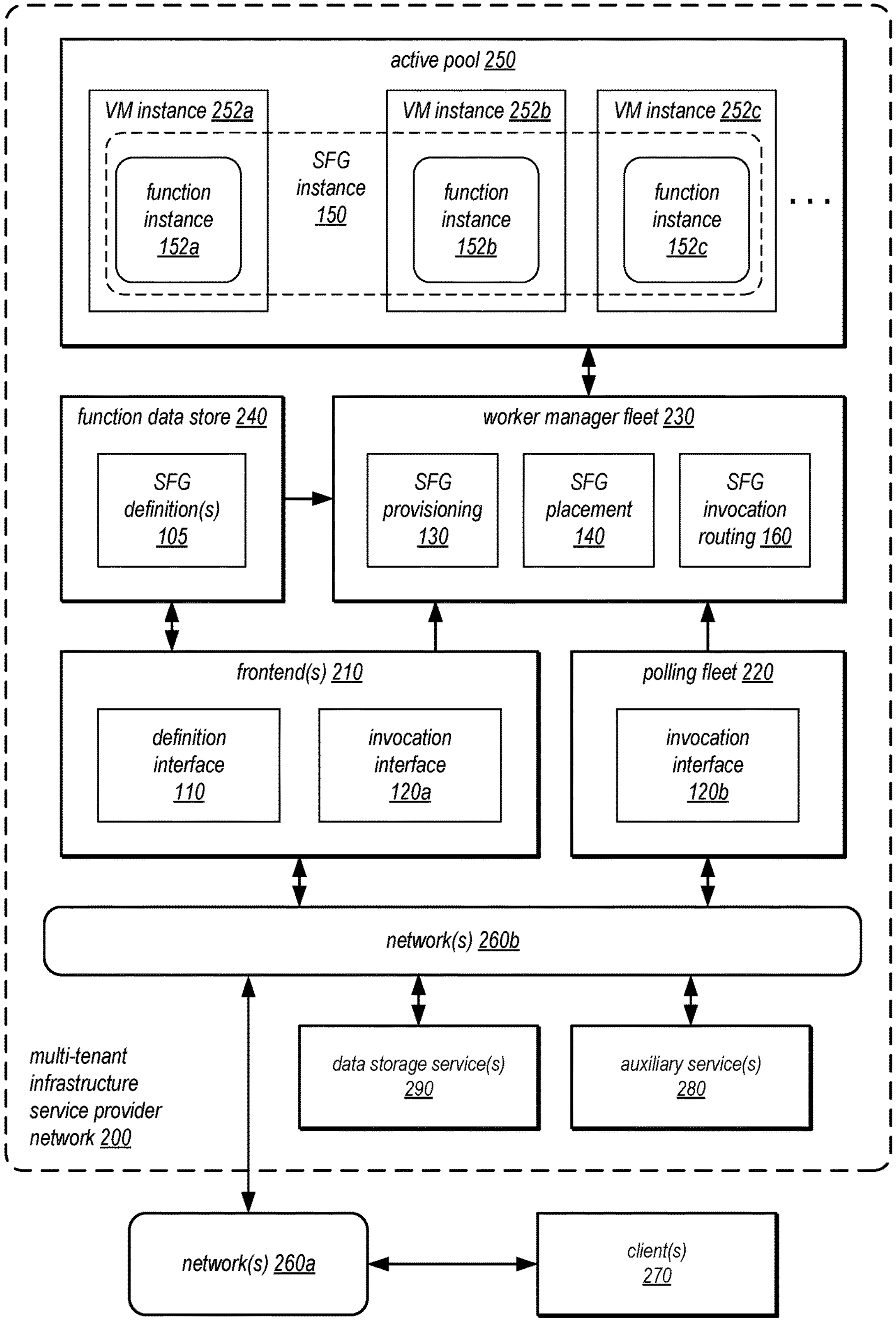
FIG. 2 illustrates an embodiment of the SFE system that is implemented in a multi-tenant infrastructure service provider network, according to some embodiments.

FIG. 2 illustrates an embodiment of the SFE system that is implemented in a multi-tenant infrastructure service provider network, according to some embodiments.

Multi-tenant infrastructure service provider network 200 may be a private or closed system or may be set up by an entity such as a company or a public sector organization to provide one or more computing infrastructure services (such as various types of cloud-based storage) accessible via the Internet and/or other networks to clients 270 in client premises networks, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service, one or more compute service(s), data storage service(s) 290, data analytic service(s), machine learning service(s), as well as other types of services such as auxiliary service(s) 280.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component may be implemented by a particular node or may be distributed across several nodes. In some embodiments, a given node may implement the functionality of more than one service system component (e.g., more than one data store component).

The compute service(s) implemented by service provider network 200 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30% to 35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length. In this example, compute instances provided by the service provider network 200 may be used to the poller fleet 220, worker manager fleet 230, and individual VM instances 252 in the active pool 250 used to host the SFG instance 150.

To implement the VPC service, the service provider network 200 provides a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service may implement one or more client networks as overlay networks of virtualized computing resources (e.g., compute instances provided by the compute service(s), block store volumes, data objects such as snapshots and machine images, file storage, databases provided by the database or data storage service(s) 290) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. The offload card can function as a network interface card (NIC) of a host in some implementations, and can implement encapsulation protocols to route packets. In this example, the virtual network 154 of the SFG instance 150 may be provided and managed by the VPC service.

Generally speaking, the clients 270 may encompass any type of client configurable to submit network-based requests to service provider network 200 via network 260. For example, a given client device may include a suitable version of a web browser, or may include a plug-in module or other type of code module that may execute as an extension to or within an execution environment provided by a web browser. Alternatively, a client 270 may encompass an application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, a client 270 may be an application that interacts directly with service provider network 200. In some embodiments, the SFE system 100 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the SFE system 100), scheduling event-based jobs or timed jobs, tracking the user-provided code, and/or viewing other logging or monitoring information related to their requests and/or user codes.

As shown, the clients 270 can convey network-based services requests to and receive responses from service provider network 200 via one or more networks (e.g. networks 260*a* and 260*b*). In various embodiments, network(s) 260 may encompass any suitable combination of networking hardware and protocols necessary to establish network-based-based communications between clients 270 and service provider network 200. For example, network 260 may generally encompass the various telecommunications networks and service providers that collectively implement the Internet. Network(s) 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

As shown, the service provider network 200 may implement one or more auxiliary services 280, which can interact with the SFE system 100 to implement desired functionality on behalf of a user. Auxiliary services 280 can correspond to network-connected computing devices, such as servers, which generate data accessible to the SFE system 100 or otherwise communicate to the SFE system 100. For example, the auxiliary services 280 can include web services (e.g., associated with user computing devices, with the SFE system 100, or with third parties), databases, really simple syndication ("RSS") readers, social networking sites, or any other source of network-accessible service or data source. In some instances, auxiliary services 280 may be associated with the SFE system 100, e.g., to provide billing or logging services to the SFE system 100. In some instances, auxiliary services 280 actively transmit information, such as API calls or other task-triggering information, to the SFE system 100. In other instances, auxiliary services 280 may be passive, such that data is made available for access by the SFE system 100. As described below, components of the SFE system 100 may periodically poll such passive data sources, and trigger execution of tasks within the SFE system 100 based on the data provided. While depicted in FIG. 2 as distinct from the clients 270, in some embodiments, various auxiliary services 280 may be implemented by either a client 270 or as part of the SFE system 100.

As shown, the service provider network 200 may implement one or more network-based data storage service(s) 290, configured to enable the SFE system 100 to store and retrieve data from one or more persistent or substantially persistent data sources. Illustratively, the network-based data storage services 290 may enable the SFE system 100 to retrieve a set of data to be analyzed, and store information (e.g., results) regarding that analysis. The network-based data storage services 290 may represent, for example, a relational or non-relational database. In another example, the network-based data storage services 290 may represent a network-attached storage (NAS), configured to provide access to data arranged as a file system. Various other functionalities may be included within network-based data storage services 290 usable within embodiments of the present disclosure. The network-based data storage services 290 may further enable the SFE system 100 to query for and retrieve information regarding data stored within the SFE system 100, such as by querying for a number of relevant files or records, sizes of those files or records, file or record names, file or record creation times, etc. In some embodiments, the network-based data storage services 290 may provide additional functionality, such as the ability to separate data into logical groups (e.g., groups associated with individual accounts, etc.). While shown as distinct from the auxiliary services 280, the network-based data storage services 290 may in some embodiments also represent a type of auxiliary service 280.

To enable storage of tasks or functions, in some embodiments, the SFE system 100 may implement a task or function data store 240, which may correspond to a persistent or substantially persistent data store, such as a hard drive (HDD), a solid-state drive (SDD), network attached storage (NAS), a tape drive, or any combination thereof. In this example, the function data store 240 may be implemented using a network-based data storage service 290 provided by the service provider network 200, and used to store the SFG definitions 105 discussed in connection with FIG. 1.

To enable interaction with the SFE system 100, in some embodiments, the service provider network 200 includes one or more frontend(s) 210, which enable interaction with the SFE system 100. In an illustrative embodiment, the frontends 210 serve as a "front door" to the other services, enabling users (via clients 270) to provide, request execution of, and view results of computer executable code. The frontends 210 include a variety of components to enable interaction between the SFE system 100 and other computing devices. For example, each frontend 210 may include a request interface providing user computing devices with the ability to upload or otherwise communicate user-specified code to the SFE system 100 and to thereafter request execution of that code. In one embodiment, the request interface communicates with external computing devices (e.g., client computing devices 270, auxiliary services 280, etc.) via a graphical user interface (GUI), CLI, or API. The frontends 210 process the requests and makes sure that the requests are properly authorized. For example, the frontends 210 may determine whether the user associated with the request is authorized to access the user code specified in the request. In this example, the frontend 210 may be used to implement the definition interface 110 and an invocation interface 120, as discussed in connection with FIG. 1.

In some embodiments, the frontend 210 can further include an output interface configured to output information regarding the execution of tasks or functions on the SFE system 100. Illustratively, the output interface may transmit data regarding task or function executions (e.g., results of a task, errors related to the task execution, or details of the task execution, such as total time required to complete the execution, total data processed via the execution, etc.) to the client computing devices 270 or to auxiliary services 280, which may include, for example, billing or logging services. The output interface may further enable transmission of data, such as service calls, to auxiliary services 280. For example, the output interface may be utilized during execution of a task or function to transmit an API request to an auxiliary service 280 (e.g., to store data generated during execution of the task).

As shown, the service provider network 200 may implement a polling fleet 220, which may operate as part of the SFE 100. The polling fleet 220 may include one or more computing devices configured to periodically transmit a request to the auxiliary services 280, data storage services 290, or clients 270 to retrieve any newly available data (e.g., social network "posts," news articles, image or video files, records, etc.), and to determine whether that data corresponds to a user-established criteria triggering execution a task on the SFE system 100. Illustratively, criteria for execution of a task may include, but is not limited to, whether new data is available at the auxiliary services 280, data storage services 290, or client devices 270, the type or content of the data, or timing information corresponding to the data. In some instances, the auxiliary services 280, data storage services 290, or client devices 270 may function to notify the frontend 210 of the availability of new data, and thus the polling fleet 220 may be unnecessary with respect to such services. As shown in this example, the polling fleet 220 may be used to implement another invocation interface 120*b* of the SFE system 100.

As shown, in some embodiments, the SFE system 100 further includes a fleet of worker managers 230 that manage the execution environments, such as virtual machine instances 252*a-c* used for servicing incoming calls to execute tasks, and that manage the memory states of execution environments. While the following will be described with reference to virtual machine instances 252 as examples of such environments, embodiments of the present disclosure may utilize other environments, such as software containers. In the example illustrated, each worker manager in the fleet 230 may manage an active pool 250, which is a group (sometimes referred to as a pool) of virtual machine instances 252 executing on one or more physical host computing devices that are initialized to execute a given task (e.g., by having the code of the task and any dependency data objects loaded into the instance). The active pool 250 illustratively is implemented using primary memory (e.g., RAM) of host devices implementing or under control of the worker manager in the worker manager fleet 230.

Once a triggering event to execute a task (e.g. a serverless function) has been successfully processed by a frontend 210, the frontend 210 passes a request to a worker manager 230 to execute the task. In one embodiment, each frontend 210 may be associated with a corresponding worker manager in the worker manager fleet 230 (e.g., a worker manager co-located or geographically nearby to the frontend 210) and thus, the frontend 210 may pass most or all requests to that worker manager. In another embodiment, a frontend 210 may include a location selector configured to determine a worker manager to which to pass the execution request. In one embodiment, the location selector may determine the worker manager to receive a call based on hashing the call, and distributing the call to a worker manager selected based on the hashed value (e.g., via a hash ring). Various other mechanisms for distributing calls between worker managers will be apparent to one of skill in the art.

In some embodiments, the worker manager may modify a virtual machine instance 252 (if necessary) and execute the code of the task within the instance 252. An VM instance 252 may be deployed with an operating system, a language runtime, and user code (e.g. the function code). The OS, runtime, and user code may collectively enable execution of a function instance to perform the task. In some embodiments, each VM 252 may be associated with additional information, such as state information. For example, the state of a VM 252 may be maintained within registers of a virtual CPU of the VM, within RAM of the VM, within a virtual disk drive of the VM, or the like. As shown in this example, the active pool 250 may be used to maintain the VM instances 252 used to host individual function instances 152 of SFG instance 150. The SFG provisioning component 130, SFG placement 140, and SFG invocation routing component 160 of FIG. 1 may be implemented by one or more worker managers in the worker manager fleet 230.

While some functionalities are generally described herein with reference to a particular component of the SFE system 100, other components or a combination of components may additionally or alternatively implement such functionalities. Other variations of implementing the described functionality are known to those skilled in the art, and thus not described in more detail herein.

Figure 3:
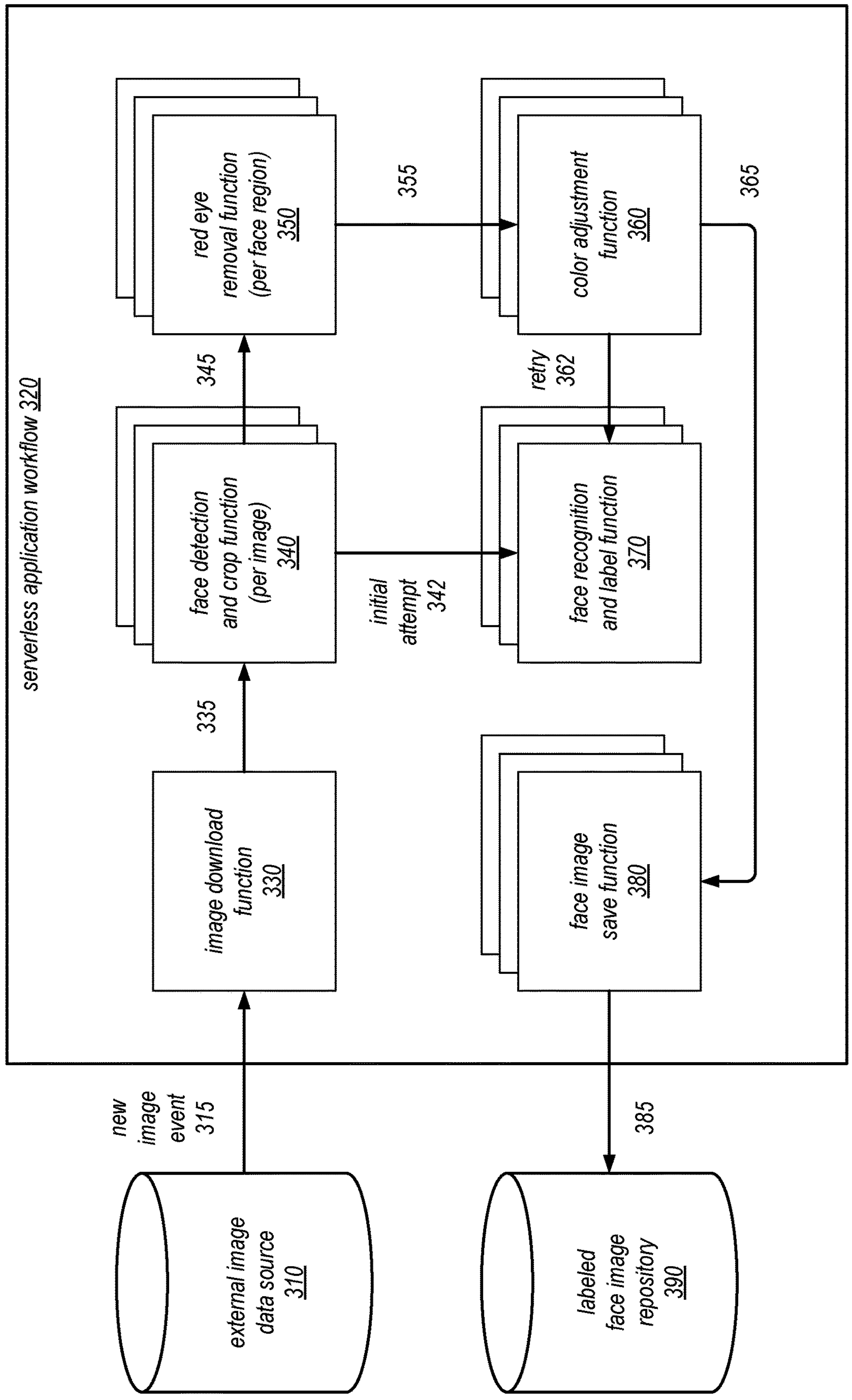
FIG. 3 illustrates an example serverless application workflow that can be implemented as a serverless function group (SFG) executable on the SFE system, according to some embodiments.

FIG. 3 illustrates an example serverless application workflow that can be implemented as a serverless function group (SFG) executable on the SFE system, according to some embodiments.

As shown, the figure depicts a serverless application workflow 320 that can be implemented using a number of serverless functions 330, 340, 350, 360, 370, and 380. This illustrative workflow may be implemented as a SFG as discussed, to enable data sharing and function-to-function invocation during execution on the SFE system.

In this example, the image download function 330 is programmed to download image files from an external image data source 310, in response to a new image event 315 indicating that new image files are available for processing. The image download function 330 may download the images and save them to the shared file store of the SFG instance (e.g. file store 156), so that they are accessible by other function instances executing in the SFG. Advantageously, the image files are downloaded only once without each subsequent function instance having to download its own copy. This approach can dramatically reduce network usage of the serverless application and improve the performance of the serverless application. In some embodiments, the image download function may be provided as a standard developer function that automatically downloads data from different external data sources to prime the SFG.

Once the image download function 330 completes, it invokes 335 a number of face detection and crop function instances 340, which will attempt to detect faces in the images and crop the images to obtain regions in the image that contain the faces (e.g. rectangular boxes). The face detection and crop function instances 340 will execute in parallel to process individual image files. The invocation 335 may be performed using the invocation routing component 160 of FIG. 1, and may cause new instances of the invoked function 340 to be provisioned by the system. Prior to the invocation, the image download function instance 330 may populate the shared execution cache 158 to indicate execution parameters for the downstream function instances, for example, file names of the image files that were downloaded.

As shown, when a face region is detected by the face detection and crop function 340, the function instances will invoke 342 a face recognition and label function 370 to attempt to identify the face and label the face region with the identity of the person in the region. In this example, invocation 342 represents an initial attempt at face recognition. If a recognition of a face region is successful, that region may be immediately labeled in the execution data cache. The face detection and crop function instances 340 will also invoke 345 the red eye removal function 350, which may cause multiple instances of that function 350 to spawn. The facial regions generated by the face detection and crop function 340 may be kept in the execution data cache, without writing the regions to the shared file store.

The red eye removal function instances 350 will process each face region to remove red eyes in the regions, and then invoke 355 the color adjustment function 360. Instances of the color adjustment function 360 will process the face regions to adjust the coloring in the regions. The color adjustment function instances 360 may then invoke the face recognition and label function 370 again, to retry face recognition on the face region after the colors have been adjusted. The color adjustment function 360 may first check the execution data cache to see if the initial attempt of facial recognition on a face region is successful, and only perform the retry if the initial attempt was not successful. The color adjustment function instances 360 will then invoke 365 the face image save function 380.

The face image save function instances 380 will take the labeled face regions in the execution data cache and write 385 the regions out as image files to an external labeled face image repository 390. The writing 385 may be performed in batches to reduce the number of write operations that are made to the repository 390. In some embodiments, one or more connections to the repository 390 may be kept in a connection pool maintained by the SFG and reused for repeated writes to the repository. The face image save function instances may first save the labeled facial regions to the shared file store as files, and then send the files to the repository 390 on its own schedule, in order to free up space in the execution data cache. In some embodiments, the face image save function 380 may be provided to developers as a standard serverless function that can be configured to save data to many types of common repositories.

During the execution of the serverless application, the SFE system will manage the SFG instance to provision and deprovision resources in the SFG as needed. For example, the SFE system may add one or more VM instances for a function type when they are needed, and remove one or more VM instances of a function type when they are no longer needed. In some embodiments, the configuration data for the SFG may specify an idle wait period for a particular function type, so that a function instance that has completed execution are not immediately deprovisioned. The idle function instance may be retained for the wait period and reused for another invocation that arises during the serverless execution.

The SFG instance will be kept alive by the SFE system until all image files have been processed, and deprovisioned when all function instances in the SFG have completed execution. The deprovisioning will cause all resources in the SFG (e.g. VM instances, virtual network(s), file storage volume(s), key-value store(s)) to be destroyed, terminated, or released so that these resources can be used for other serverless executions. In case a resource is to be reused, a cleanup step may be performed on the resource to remove any previous execution artifacts. The resource may then be placed into a warm pool or an available pool for use by other serverless executions.

Figure 4:
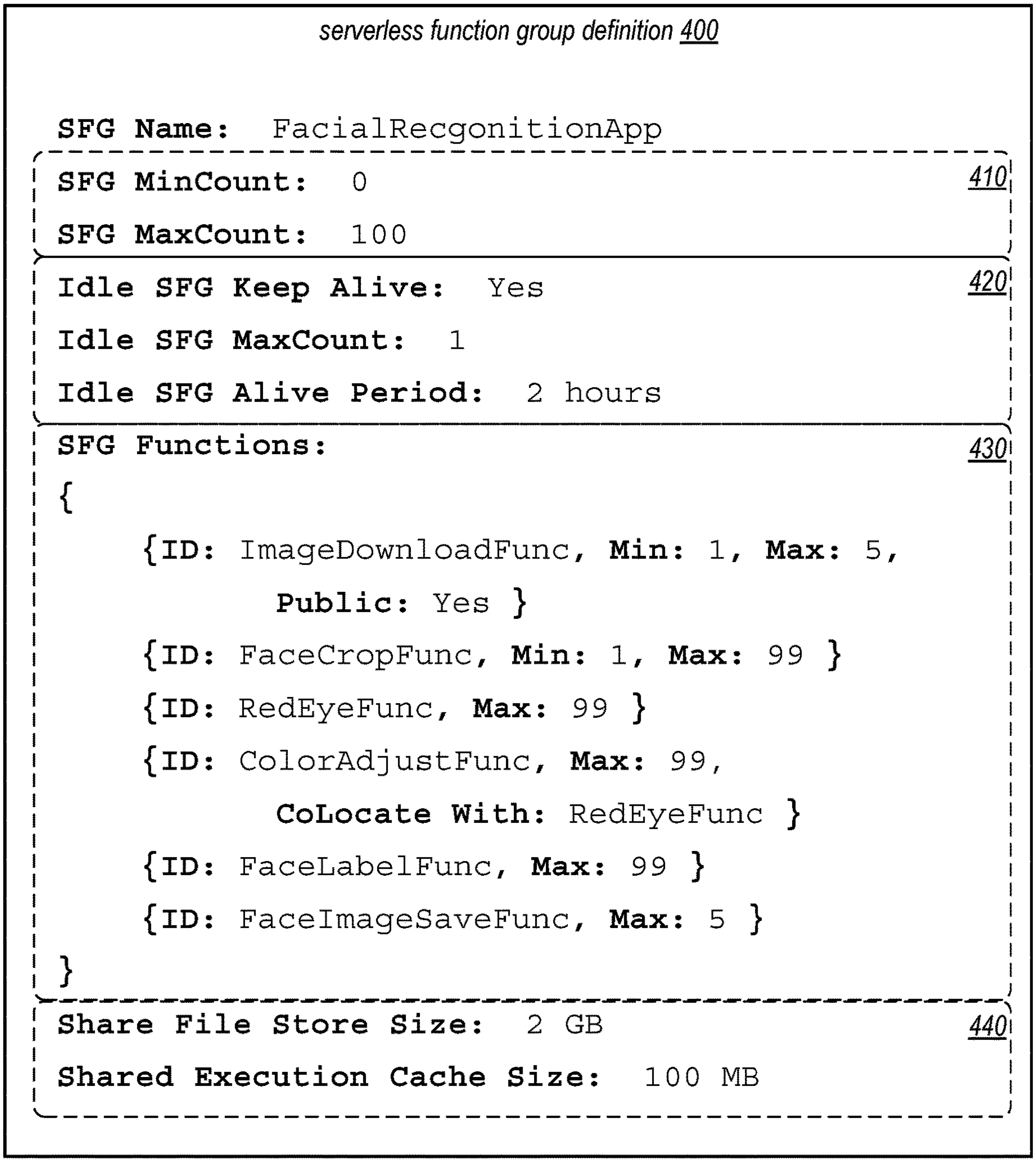
FIG. 4 illustrates an example SFG definition for a SFG that is executable on the SFE system, according to some embodiments.

FIG. 4 illustrates an example SFG definition for a SFG that is executable on the SFE system, according to some embodiments. The serverless function group definition 400 shown in the figure may be an example of the SFG definition 105 of FIG. 1.

As shown, SFG definition 400 in this example is specified in a human-readable text form. In some embodiments, the SFG definition 400 may be formatted as a JSON data structure, which may be specified as a parameter in a web service call (e.g. a call to the definition interface 110 of FIG. 1). However, the SFG definition may be encoded in other data formats (e.g. depending on the type of database used to store the definitions).

As shown, the SFG definition 400 indicates a name of a serverless application ("FacialRecognitionApp") associated with the SFG. Section 410 specifies a minimum number and maximum number of instances of the SFG that can be provisioned by the SFE system. The SFE system is configured to spawn many independently executing instances of the SFG depending on the level of demand for the SFG. The parameters of section 410 constraints this dynamical scaling capability of the SFE. In some embodiments, a minimum count of zero indicates that no instances of the SFG need be kept alive by the SFE system if there is no demand for the workload.

Section 420 specifies a number of "keep alive" parameters for the SFG, which controls how many instances of the SFG should be kept alive after an SFG instance has finished execution (e.g. after the instance has gone idle), and for how long. As shown, in this example, one idle instance of the SFG will be kept alive for a period of two hours. A SFG instance in the idle state may maintain only the shared file store, the shared execution data store, and the minimum number of serverless function instances specified by the definition (possibly zero function instances). If no invocations are received by the SFG instance after two hours of idle time, the last SFG instance will be deprovisioned. A delayed deprovisioning setting such as this can be useful for workloads where execution demand comes in bursts. By maintaining at least one SFG instance after recent activity, the SFE system can immediately use the SFG instance for new requests, without having to provision new SFG instances or incur substantial provisioning costs.

Section 430 defines the types of functions that belong to the SFG, along with the configuration attributes of each function. As shown, each function may be associated with a min and max attribute, which controls how many instances of the function can be provisioned during execution. In some embodiments, the min count defaults to zero, and the max count defaults to a maximum limit controlled by the SFE system. As shown, the ImageDownloadFunc definition specifies that it is a public function. This attribute means that the function is invocable from outside the SFG, for example, by clients of the SFE system or other SFG instances. In this example, the ImageDownloadFunc function represents an entry point of the serverless application and is publicly invocable. As shown, the ColorAdjustFunc definition indicates that that function should be co-located with the RedEyeFunc function. In some embodiments, the SFG definition may specify such parameters as hints to the SFG system, to influence how resources in the SFG should be placed or provisioned. In some embodiments, by default, the SFE system will attempt to co-locate all resources of a SFG instance on a single physical host. However, in cases where a SFG instance spans multiple hosts, the user may suggest that certain function instances should be co-located to take advantage of host-specific data locality. In some embodiments, the SFG definition may also indicate that certain functions should not be co-located, for example, because they are likely to create resource contentions with one another.

Finally, section 440 in this example specifies attributes (here the sizes) of the shared file store and the shared execution cache. Depending on the embodiment, the SFG definition may also include other attributes about the data store(s) such as the type (e.g. the access API) of data store, whether the data store should be replicated or partitioned across hosts, and/or types of data that should be pre-populated in the data store.

Figure 5:
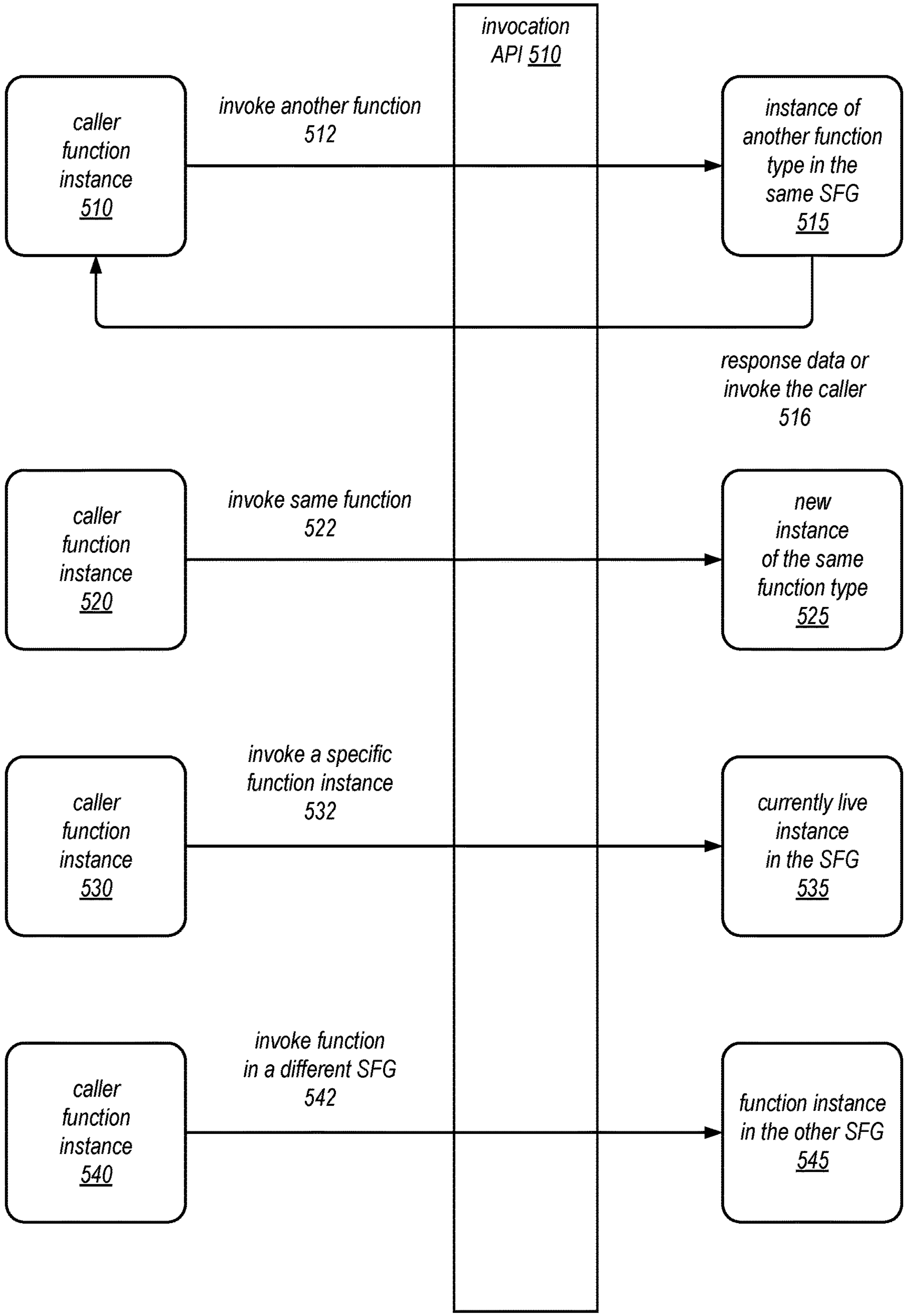
FIG. 5 illustrates different types of serverless function invocations implemented by the SFE system, according to some embodiments.

FIG. 5 illustrates different types of serverless function invocations implemented by the SFE system, according to some embodiments.

As shown the figure illustrates four types of function-to-function invocations by a caller function instance, via an invocation API 510. In some embodiments, the invocation API 510 may be provided as a software library that is available to function developers who write serverless functions for the SFE system. The API 510 may be provided indifferent programming languages. In some embodiments, the API 510 may be implemented as a service interface that is exposed by a separate process on the VM instances or external to the VM instances. Some of the API interactions illustrated in the figure may be implemented by the invocation interface 120 of FIG. 1, while other illustrated interactions are only available to serverless function instances executing within the SFG.

The first invocation interaction at the top of the figure is an invocation 512 from a caller function instance 510 to invoke another type of function defined in the SFG. In this example, the invocation request 512 may specify the identifier of the called function type, but not a specific instance of the called function. The SFE system will determine the actual instance of function 515 that is invoked by invocation request 512. If there are multiple available instances of the called function type in the SFG, the SFE system will select one. If there are no available instances of the called function type, the SFE system may provision a new instance of the called function type. In some embodiments, the API 510 may provide a special type of invocation that instructs all function instances of the called type to repeatedly execute from a work queue until the work queue is exhausted. The work queue may be maintained in a shared data store of the SFG instance, such as the shared file store or shared execution data cache.

As shown, in some embodiments, the called function instance 515 may provide response data or another invocation request 516 back to the caller instance 510. In some embodiments, the initial invocation 512 may indicate an identifier of the caller instance 510, and the callee instance 515 can use the identifier to send the response 516. In some embodiments, the identity of the caller 512 may be tracked by the invocation router of the SFE system, so that the callee function does not need to know or obtain the caller's identifier.

The second invocation interaction is an invocation 522 from a first instance of a function 520 to a second instance of the same function 525. In this example, the invocation request 522 will cause the SFE system to provision a new instance of the function and use that instance to handle the invocation 522. This type of invocation may be used by function instances to "self-scale" the function type, which is useful for certain types of workload processing patterns where the function is a good position to manage its own scaling.

The third invocation interaction is an invocation 532 from a caller instance 530 directed to a specific function instance 535 that is currently live in the SFG. In this example, the invocation request 532 will specify a specific identifier of the called function instance 535. The identifier of the called function may be populated in the shared execution cache of the SFG, so that it can be retrieved by caller function instances during execution. This type of function may be useful in situations where two or more function instances are closely collaborating with one another (e.g. taking turns processing the same piece of data).

The last invocation interaction is an invocation 542 by a caller function instance 540 to a function in a different SFG 545. In this example, the invocation request 542 may specify a resource identifier of the other SFG and the function identifier of the invoked function in the other SFG. This information may be hardcoded into the caller's function code, or in some embodiments, obtained through a global data store or service provided SFE system. If the other SFG has no live instances in the SFE system, a new instance of the SFG may be provisioned to handle the invocation 542. In some embodiments, subject to system permissions, the caller function instance 540 may be able to invoke a live instance of the other SFG and even a live instance of a function within the other SFG instance.

Figure 6:
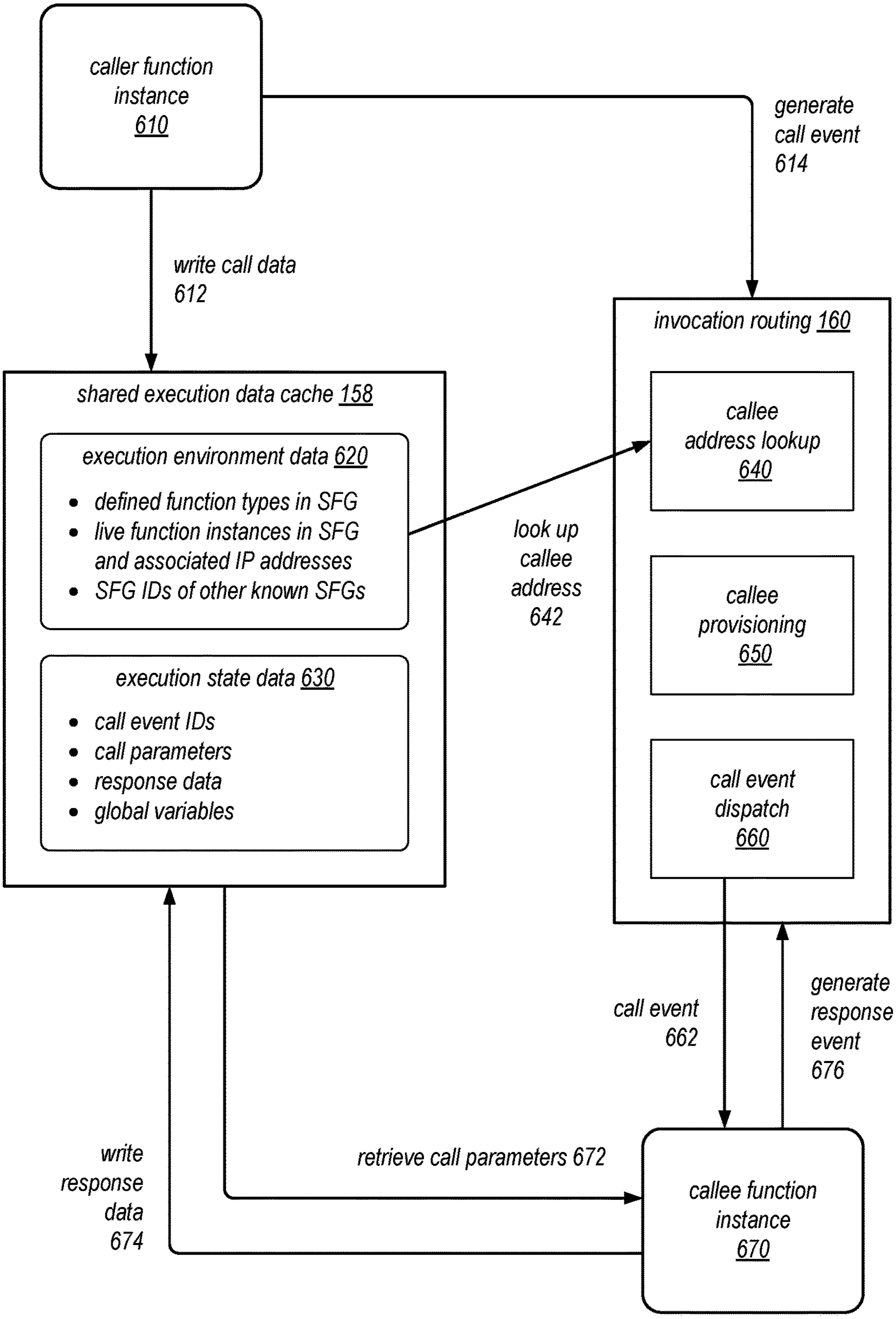
FIG. 6 illustrates an example process performed by the SFE system during a serverless function invocation, according to some embodiments.

FIG. 6 illustrates an example process performed by the SFE system during a serverless function invocation, according to some embodiments.

As shown in this example, an invocation by a caller function instance 610 is performed using a generated call event 614 and by writing call data 612 to the shared execution data cache 158. The depicted process may be used to implement the different types of invocations shown in FIG. 5. In some embodiments, steps 612 and 614 may be performed within an invocation library (e.g. a software library that provided the invocation API 510), and not explicitly by the caller function instance 610.

To make the invocation, the caller function instance 610 generates a call event associated with the invocation and writes call data 612 to the shared execution data cache 158. The call data 612 may be added to the cache as execution state data 630, and may include metadata about the invocation such as the event ID of generated call event, any call parameters associated with the event, the intended recipient of the call event, the time of the invocation, a reference to a parent invocation (e.g. information about the full call stack), etc. Such data may be later retrieved by the callee function instance 670 during its execution to handle the invocation.

Once the call data is written to the shared execution data cache, the call event is submitted to the invocation routing component 160 to be dispatched to the callee instance 670. It is noted that in some embodiments, the call event itself can be used to carry a payload that includes call parameters associated with the invocation. In that case, the shared execution data cache may be used as a secondary mechanism for passing call data to the callee instance, for example, large data objects such as portions of an image file.

As shown, the invocation routing component 160 in this example may perform several tasks in response to receiving the call event. In cases where the call event is directed to a live instance of the callee function, the invocation routing component will first look up 642 the address of the callee instance. In some embodiments, the address may be the IP address of the VM instance hosting the callee function instance. The invocation routing component will then instruct the call event dispatch component 660 to forward the call event 662 to the destination IP address of the VM. As shown, the mapping between live function instances and their IP addresses may be maintained in the shared execution data cache 158 as execution environment data 620. The environment data 620 may include other information such as the IDs of all defined function types in the SFG, all currently live instances in the SFG and their status, SFG IDs and/or function IDs of other known SFGs, etc. In some embodiments, this environment data 620 may be visible and accessible to the caller function instance 610. In other embodiments, the environment data 620 may be kept hidden from the caller function instance 610 or stored in a different data store not accessible by the caller instance.

As shown, the invocation routing component 160 may also include a callee provisioning component 650, which may interface with the SFG provisioning component 130 of FIG. 1 to provision a new instance of the callee function when necessary. Before provisioning the new callee instance, the invocation routing component may first check the environment data 620 to verify that there is no currently live function instance available to handle the invocation. Once the new callee function instance is provisioned, the invocation routing component 160 will use the address of the new instance to forward the call event 662 to the new instance.

When the callee function instance 670 receives the call event 662, it may use the event ID of the event to retrieve 672 call parameters or call data associated with the invocation from the shared execution data cache. The callee function instance will then handle the invocation according to the attributes of the call event and the retrieved call parameters.

In some embodiments, once the callee function instance 670 finishes execution, it may return a response to the caller function instance 610. The response may be communicated to the caller function instance in much the same way as the original invocation. For example, the callee function instance may generate a response event 676 and write response data 674 to the shared execution data cache, including the event ID of the response event. The invocation routing component 160 will then dispatch the response event to the caller function instance 610, similar to how the initial call event was dispatched.

It is noted that the process described here is only an illustrative way of implementing function-to-function invocations in the SFE system. Those skilled in the art would appreciate that other mechanisms or protocols for function invocation are possible. These other variations may also be used in embodiments of the disclosed system, and will not be discussed further here.

Figure 7:
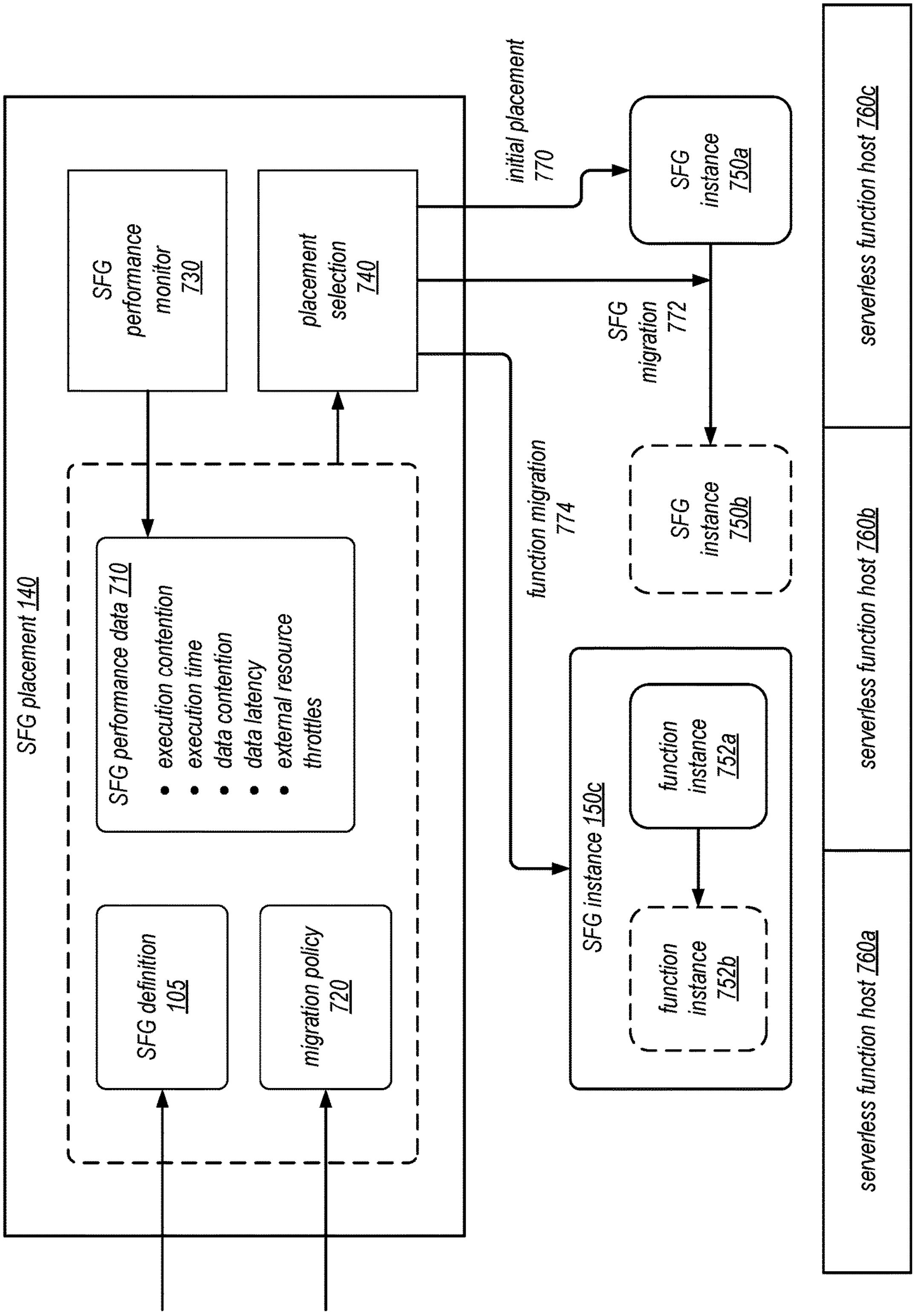
FIG. 7 illustrates the operations of a placement subsystem of the SFE system, according to some embodiments.

FIG. 7 illustrates the operations of a placement subsystem of the SFE system, according to some embodiments. As shown, the operations described in the figure may be implemented by an embodiment of the SFG placement component 140 of FIG. 1.

As shown, the SFG placement component 140 determines placement of a SFG instance 750 or a particular serverless function instance 752 across serverless function hosts 760*a-c* of the SFE system. The placement decision may be based on a combination of control factors, including the SFG definition 105, a migration policy 720, or performance data 710 of the SFG instance gathered during its lifetime.

As discussed, the SFG definition 150 may specify certain customer preferences for where and how the SFG instance and its function instances should be deployed, such as whether or not particular function instances should be co-located on a common host. The migration policy 720 may be specified by the SFG definition 105 or as part of a wider system policy controlled by system administrators. For example, the migration policy 720 may specify a maximum number of SFG instances that can coexist on a particular type of host 760, or that SFG instances will be migrated off a host 760 after it has executed for a certain time period.

The performance data 710 of SFG instances may be gathered by an SFG performance monitor component 730. In some embodiments, the SFG instance may be instrumented with a performance data gathering agent that periodically writes performance data of the SFG instance to a data repository (e.g. the shared file store). The performance data may then be periodically collected by or transmitted to the SFG performance monitor 730. Gathered performance data 710 will be used to determine whether an executing SFG instance 750 (or one or more of its serverless function instances 752) should be migrated to another host. As shown, the collected performance data 710 may include data that reflects execution contention, such as CPU utilization rate, runtime memory utilization rate, etc., within the SFG instance. The performance data may also indicate the execution time of function instances, which can be used as a measure of execution efficiency. The performance data may also include metrics regarding data contention, such as the overall read or write rate to the shared file store, the data latency for file reads and writes, etc. In some embodiments, the performance data may also include the amount or rate of request throttling by external resources (e.g. an external data store or service), which may be used as a measure of resource usage contention for the external resource.

High contention within an SFG instance may trigger migration actions by the placement selection component 740. For example, an excessively high CPU utilization level may mean that the SFG instance is an execution hotspot. In response, the SFG placement component may decide to move a part of the SFG instance to a different host to alleviate the execution contention. As another example, two function instances on two different hosts may be repeatedly accessing the same data in the shared file store or execution data store, causing data contention over the data. This data contention may be alleviated by migrating one of the function instances so that the two instances are executing on the same host, where the data access can be better coordinated.

The placement selection component 740 may be used to make placement decisions in a number of contexts. As shown, a placement decision is initially made 770 when the SFG instance 750*a* is provisioned. This initial placement decision may be triggered by the SFG provisioning component 130 of the SFE system, and may be based on the current availability and current load levels of serverless function hosts 760*a-c* in the system's host fleet. In some embodiments, the placement selection component 740 will initially attempt to place the entire SFG instance 750*a* on a single host.

During execution of the SFG instance 750*a*, the placement selection component 740 may cause the SFG instance 750*a* to be migrated 772 to another serverless function host 760*b*, to create a new SFG instance 750*b*. SFG instance 750*b* will be created a continuation of the parent instance 750*a*, which inherits the execution state of the parent instance to extend the life of the parent instance. In some embodiments, this migration step may be performed by the SFG provisioning component 130 during an execution pause of the SFG instance 750*a*.

In some embodiments, the placement selection component 740 may cause the migration 774 of a particular function instance 752*a* within an SFG instance 150*c* to a different host 760*a*, to create a continuation function instance 752*b* on the new host. A function migration 774 may be performed as an SFG instance 150*c* scales up, to split its execution footprint over multiple hosts. To implement the migration, the parent function instance 752*a* may be stopped at a point when all of its state data have been flushed to the shared execution data store or shared file store. The child function instance 752*b* may then be spun up on the new host based on the shared execution data store or shared file store. In some embodiments, the SFE system may simply being to provision new instances of the function on the new host 760*a* and stop provisioning instances of the function on the former host 760*b*.

Figure 8:
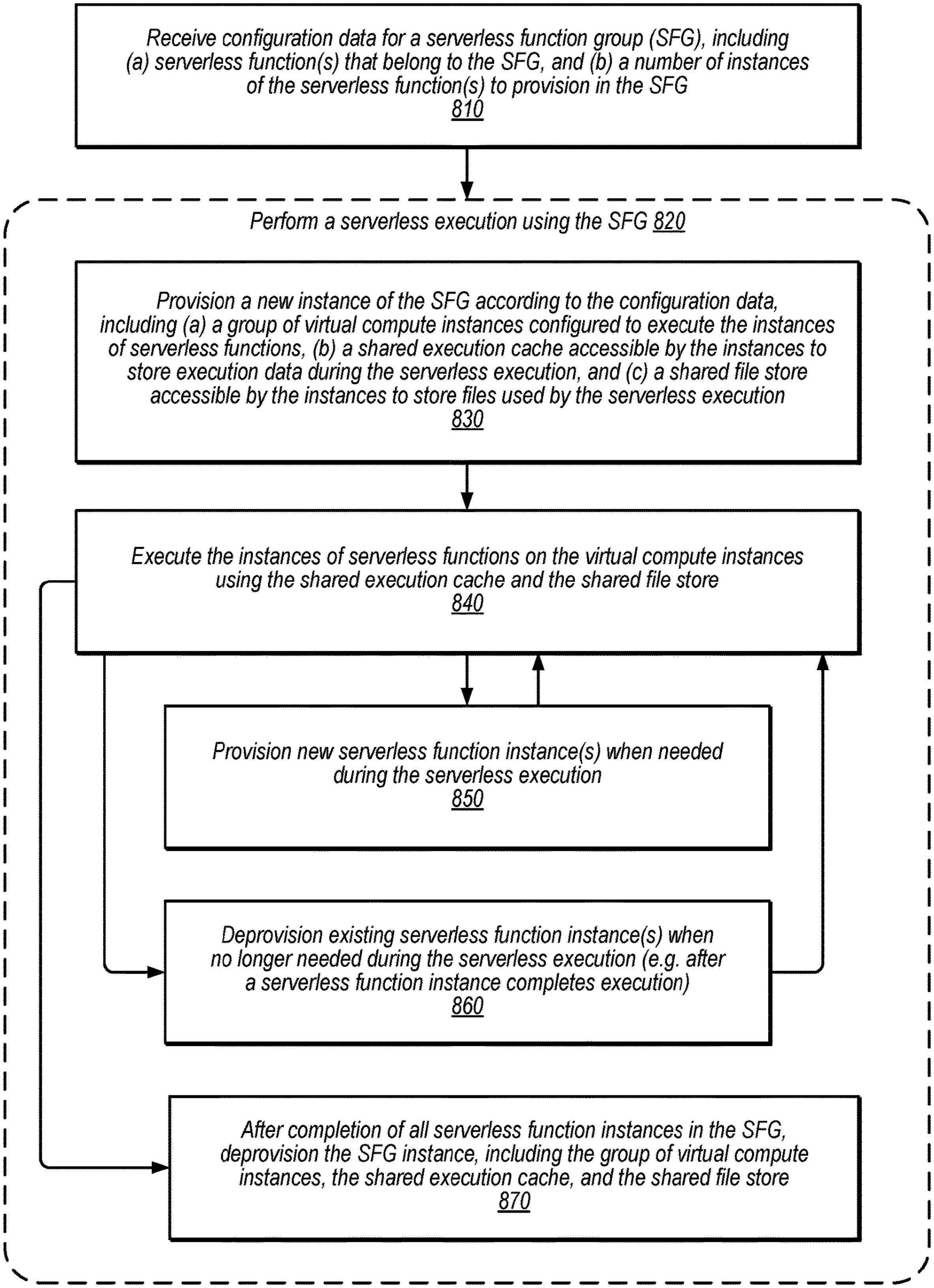
FIG. 8 is a flowchart illustrating a process of the SFE system performing a serverless execution using an SFG, according to some embodiments.

FIG. 8 is a flowchart illustrating a process of the SFE system (e.g. SFE system 100 of FIG. 1) performing a serverless execution using an SFG, according to some embodiments.

The process begins at operation 810, where the SFE system receives configuration data for a serverless function group. The configuration data may be a definition of the SFG (e.g. SFG definition 400), and may be received via an SFG definition interface of the system (e.g. definition interface 110). The configuration data may indicate attributes of the SFG including different types of serverless function(s) that belong to the SFG, and a number of instances of the serverless function(s) to provision in the SFG (e.g. the minimum and maximum number of concurrent instances of a particular serverless function that can be provisioned in the SFG). The configuration data may also include other SFG attributes, such as the minimum and maximum number of concurrent instances of the SFG can be provisioned by the system, and an execution permission attribute indicating whether each serverless function can be invoked from outside the SFG. In some embodiments, the execution permission attribute may be specified elsewhere such as an identity access and management (IAM) system.

After the SFG has been defined within the SFE system, the SFE system may then perform a serverless execution 820 using the SFG. To perform the serverless execution, at operation 830, the SFE system first provision a new instance of the SFG according to the configuration data. In some embodiments, the serverless execution may be triggered by an external event or request, and the provisioning operation 830 may be performed on demand, in response to the external event or request.

The provisioned SFG instance may include (a) a group of virtual compute instances (e.g. VM instances 252*a-c*) configured to execute serverless function instances of the SFG, (b) a shared execution cache (e.g. shared execution cache 158) accessible by the instances to store execution data during the serverless execution, and (c) a shared file store (e.g. shared file store 156) accessible by the instances to store files used by the serverless execution. The shared file store may be backed by a physical storage device that is local to the physical host(s) hosting the VM instances, or in some embodiments, a volume provisioned on a network-based volume hosting service. The shared execution data cache may be a key-value store, which may be implemented in volatile memory. In some embodiments, the VM instances may be connected in a virtual network overlayed on the substrate network of the physical host(s). The serverless function instances may be provided a mechanism (e.g. an API) to invoke one another over the virtual network.

At operation 840, the serverless function instances are executed on the VM instances using the shared execution cache and the shared file store. As discussed illustratively in connection with FIG. 3, the serverless execution may implement a workflow using the serverless function instances via function-to-function invocations. For example, the workflow may implement a serverless application where a first serverless function copies or downloads a set of files from an external data source to the shared file store, a second serverless function executes as multiple concurrent function instances to process the files, and a third serverless function outputs or saves the files or the processing results to the external data source or another external data store.

Operation 850 may be performed repeatedly by the SFE system during the serverless execution. At operation 850, the system provisions new serverless function instances in the SFG as they are needed during the execution. For example, a new function instance may be provisioned the result of a function invocation, when no instances of the invoked function are available. In some embodiments, the SFE system may proactively provision new function instances based on the observed rate of function invocations generated during the serverless execution.

Operation 860 may also be performed repeatedly by the SFE system during the serverless execution. At operation 860, the system deprovisions existing serverless function instances in the SFG when they are no longer needed during the execution. For example, an existing function instance may be no longer needed when it finishes its execution. The existing function instance may be deprovisioned immediately, or in some embodiments, permitted to remain as a live instance in the SFG for a period of time, to be reused during the serverless execution. In some embodiments, deprovisioning a serverless function instance may involve terminating or destroying the virtual machine hosting the function instance.

At operation 870, after completion of all serverless function instances in the SFG, the system deprovisions the SFG instance, including the group of virtual compute instances (or any remaining VM instances), the shared execution cache, and the shared file store. In some embodiments, a specified number of SFG instances may remain alive in the system for a period of time, to be reused to handle additional invocation events or requests during the wait period.

Figure 9:
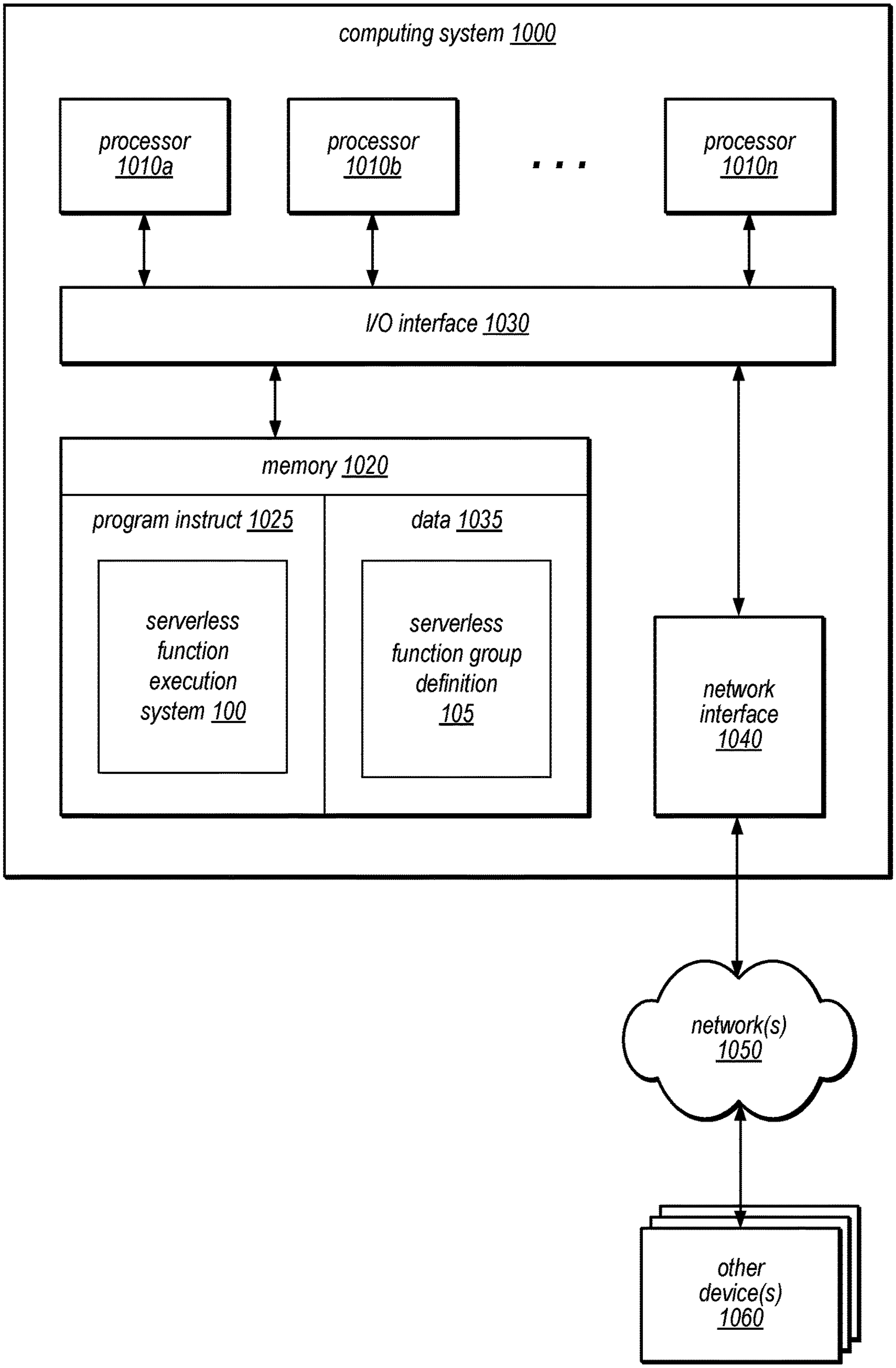
FIG. 9 is a block diagram illustrating an example computer system that can be used to implement one or more portions of the SFE system, according to some embodiments.

FIG. 9 is a block diagram illustrating an example computer system that can be used to implement one or more portions of the SFE system (e.g. SFE system 100 of FIG. 1), according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the serverless function execution system 100 of FIG. 1. As shown, in some embodiments, the data memory 1035 may be used to store data such as serverless function group definition of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more processors with associated memory that implement a serverless function execution (SFE) system, configured to:

receive configuration data for a serverless function group (SFG) executable on the SFE, wherein the configuration data specifies:

(a) one or more serverless functions that belong to the SFG, and (b) for at least one serverless function of the one or more serverless functions, a number of instances of the serverless function to provision in the SFG;

perform a serverless execution using the SFG, including to:

provision the SFG according to the configuration data, wherein the SFG includes:

(a) a group of virtual compute instances configured to execute the number of instances of the serverless function of the one or more serverless functions that are respectfully specified as belonging to the SFG, (b) a shared execution cache accessible by the instances of serverless functions to store execution data generated during the serverless execution, and (c) a shared file store accessible by the instances of serverless functions to store files used by the serverless execution;

execute the instances of serverless functions on the virtual compute instances using the shared execution cache and the shared file store; and after completion of all instances of serverless functions in the SFG, deprovision the SFG, including the group of virtual compute instances, the shared execution cache, and the shared file store.

2. A system of claim 1, wherein:

the SFE system is implemented as a service provided by a multi-tenant infrastructure service provider network;

the multi-tenant infrastructure service provider network is accessible by a plurality of clients over one or more networks and provides a plurality of services to the clients;

the configuration data is received via a graphical user interface implemented by the multi-tenant infrastructure service provider network; and the serverless execution is triggered by a request or an event generated by one of the services provided by the multi-tenant infrastructure service provider network.

3. A system of claim 1, wherein:

the virtual compute instances are virtual machine instances hosted in a physical host; and the shared file store is a volume implemented on a physical storage device local to the physical host or by a network-based volume hosting service.

4. A system of claim 3, wherein:

the virtual machine instances are provisioned in an overlay network, wherein the overlay network is isolated so that the virtual machine instances are not addressable from outside the overlay network.

5. A system of claim 1, wherein the execution cache is a key-value store maintained in volatile memory.

6. A method, comprising:

performing, by a serverless function execution (SFE) system implemented by one or more processors with associated memory:

receiving configuration data that for a serverless function group (SFG) executable the SFE, wherein the configuration data specifies:

(a) one or more serverless functions that belong to the SFG, and (b) for at least one serverless function of the one or more serverless functions, a number of instances of the serverless function to provision in the SFG;

performing a serverless execution using the SFG, including:

provisioning the SFG according to the configuration data, wherein the SFG includes:

(a) a group of virtual compute instances configured to execute the number of instances of the serverless function of the one or more serverless functions that are respectfully specified as belonging to the SFG, and (b) a shared file store accessible by the instances of serverless functions to store files used by the serverless execution;

executing the instances of serverless functions on the virtual compute instances using the shared file store; and after completion of all instances of serverless functions in the SFG, deprovisioning the SFG, including the group of virtual compute instances and the shared file store.

7. The method of claim 6, wherein:

the virtual compute instances are virtual machine instances hosted in a physical host; and the shared file store is a volume implemented on a physical storage device local to the physical host or by a network-based volume hosting service.

8. A method of claim 6, wherein the SFG includes an in-memory execution cache implemented using a key-value store, and the in-memory execution cache is used to share execution data among the instances of serverless functions during the serverless execution.

9. A method of claim 8, further comprising the SFE system storing metadata about the SFG in the key-value store, the metadata including one or more of:

different types of serverless functioned defined for the SFG, identifiers of live serverless function instances in the SFG, or configuration attributes specified for the SFG.

10. A method of claim 6, wherein the configuration data specifies one or more of:

multiple types of serverless functions that belong to the SFG, whether a type of serverless function is invocable from outside the SFG, a minimum and maximum number of concurrent instances of a type of serverless function, or a minimum and maximum number of concurrent instances of the SFG.

11. A method of claim 6, further comprising the SFE system managing life cycles of serverless functions in the SFG, including:

provisioning a new serverless function instance when needed during the serverless execution; and deprovisioning an existing serverless function instance when no longer needed during the serverless execution.

12. A method of claim 11, further comprising the SFE system:

keeping the SFG provisioned with the shared file store for a time period after completion of the serverless execution; and deprovisioning the SFG after passage of the time period during which the SFG is not used.

13. A method of claim 6, further comprising the SFE system:

issuing, from a first serverless function instance in the SFG, an invocation request for a second serverless function instance in the SFG, wherein the invocation request is issued via an invocation interface provided by the SFE system; and invoking the second serverless function instance according to the invocation request.

14. A method of claim 13, wherein the second serverless function instance is provisioned in the SFG when the invocation request is issued, and the invocation request specifies an identifier of the second serverless function instance.

15. The method of claim 6, further comprising the SFE system:

placing two serverless function instances of the SFG on a same physical host based at least in part on a determination that the two serverless function instances will share execution data or file data during the serverless execution.

16. The method of claim 6, further comprising the SFE system:

placing two serverless function instances of the SFG on different physical hosts based at least in part on a determination that the two serverless function instances will cause data or execution contention on a single physical host.

17. The method of claim 6, further comprising the SFE system:

monitoring one or more performance metrics of the SFG; and migrating the SFG or one or more serverless function instances in SFG to a different physical host based at least in part on the one or more performance metrics.

18. The method of claim 6, wherein the configuration data specifies:

a first serverless function that copies a set of files from an external data source to the shared file store;

a second serverless function that executes as multiple concurrent serverless function instances to process the set of files; and a third serverless function that outputs the set of files to the external data source or another external data store.

19. One or more non-transitory computer-accessible storage media storing program instructions that when executed on one or more processors of serverless function execution (SFE) system, cause the SFE system to:

receive configuration data that defines a serverless function group (SFG) to be executed on the SFE, wherein the configuration data specifies:

(a) one or more serverless functions that belong to the SFG, and (b) for at least one serverless function of the one or more serverless functions, a number of instances of the serverless function to provision in the SFG;

perform a serverless execution using the SFG, including to:

provision the SFG according to the configuration data, wherein the SFG includes:

(a) a group of virtual compute instances configured to execute the number of instances of the serverless function of the one or more serverless functions that are respectfully specified as belonging to the SFG, and (b) a shared file store accessible by the instances of serverless functions to store files used by the serverless execution;

execute the instances of serverless functions on the virtual compute instances using the shared file store; and after completion of all instances of serverless functions in the SFG, deprovision the SFG, including the group of virtual compute instances and the shared file store.

20. The non-transitory computer-accessible storage media of claim 19, wherein the program instructions when executed on the one or more processors cause the SFE system to provision a key-value store as part of the SFG, wherein the key-value store is used to implement an in-memory execution cache used to share execution data among the instances of serverless functions during the serverless execution.

* * * * *